United States Patent Office 2,788,942
Patented Apr. 16, 1957

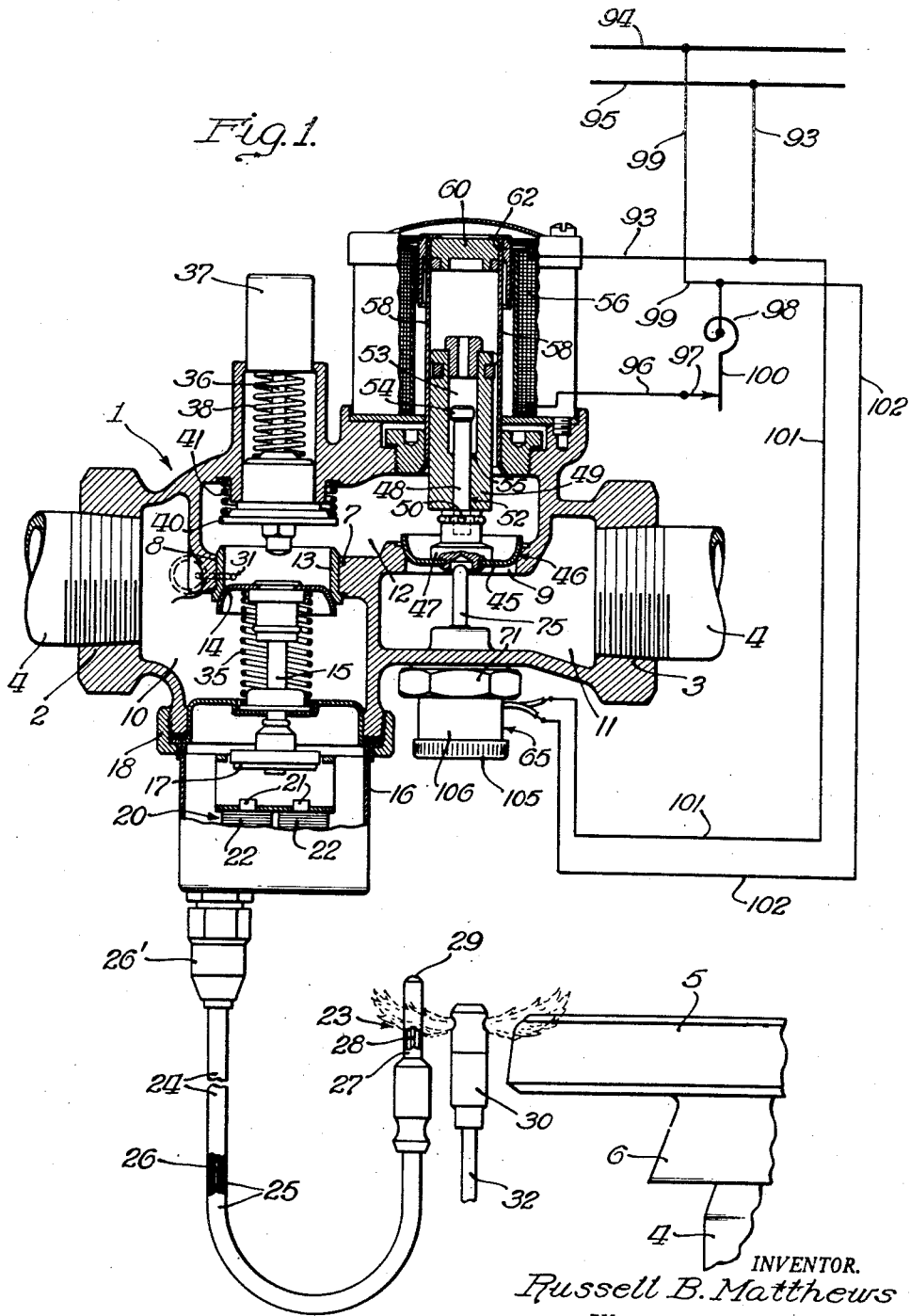

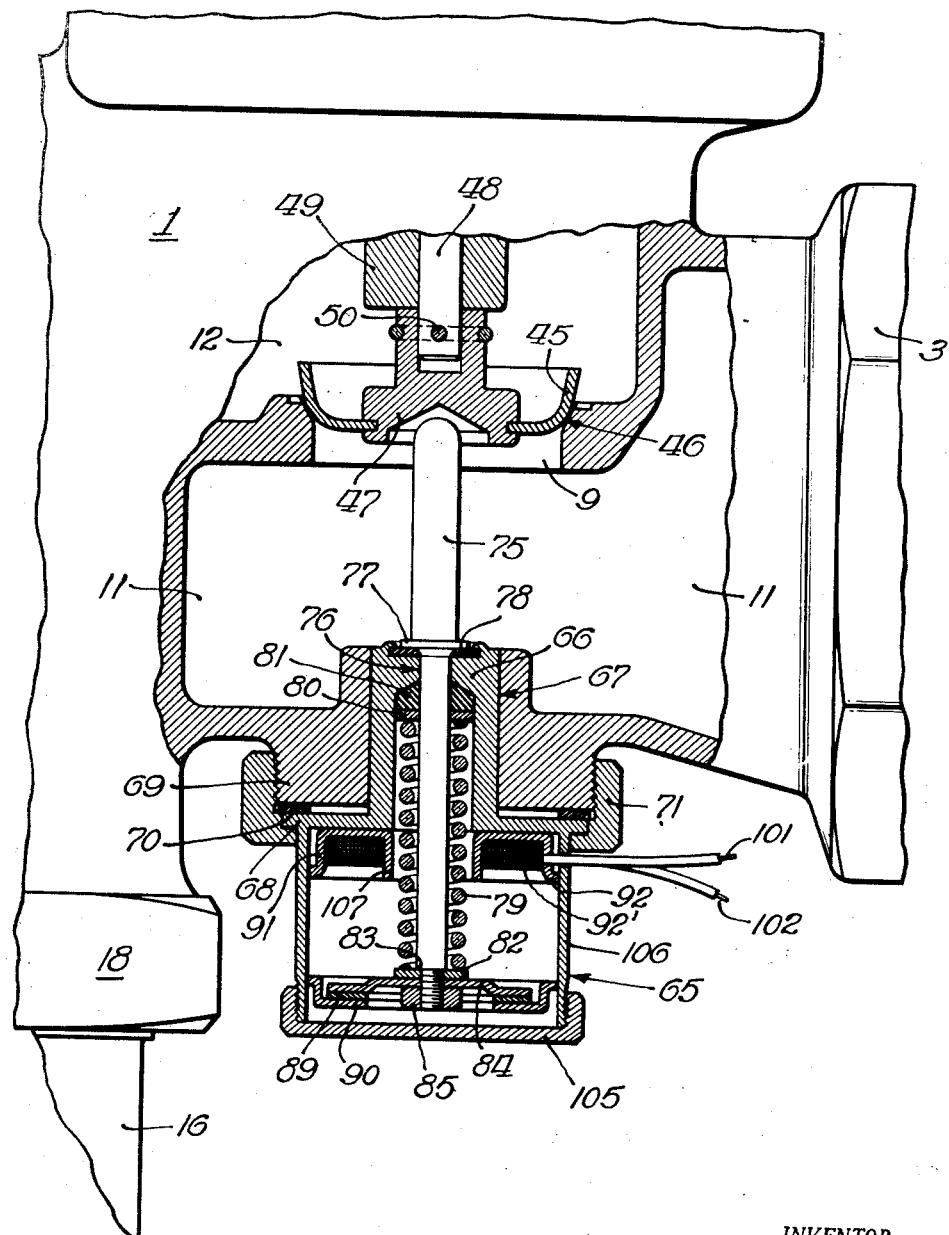

2,788,942

MANUAL OPERATOR WITH ELECTRICAL RELEASE FOR POWER OPERATED VALVES

Russell B. Matthews, Wauwatosa, Wis., assignor to Milwaukee Gas Specialty Company, Milwaukee, Wis., a corporation of Wisconsin Continuation of abandoned application Serial No. 204,187, January 3, 1951. This application January 19, 1956, Serial No. 560,101

10 Claims. (Cl. 236—9)

This application is a continuation of my application Serial No. 204,187, filed January 3, 1951, now abandoned, and relates, in general, to valves, and has particular relation to a manual operator with electrical release for power operated valves.

With the particular device which will be described hereinafter in connection with the drawing is a manual operator with electrical release as applied to an electroresponsive or electrically operated valve, and more particularly as applied to a combined thermoelectric shut-off and solenoid valve, it is to be understood that the manual operator with electrical release of the present invention is not limited to use with this particular type of valve, but may be employed with other electroresponsive or power operated valves as suitable or desired.

In the application, for example, of electric solenoid valves to the control of fluid flow, there are occasions when it is imperative that the valve continue to allow the flow of fluid at times when the source of electric power may be disabled (i. e., when there is failure of the electric current supply) for some time. In order to accomplish this purpose it has been common practice to provide a manual botton which can be used to hold the valve open, thus allowing a continuation of the fluid flow even though there is no power, for example, on the solenoid coil. These manual buttons have held the valve open until it is manually released.

With such devices as set forth above there is the possibility that after a valve has been opened manually and electric power is restored, the operator may forget that the valve is still held open by the manual means and expect it to function automatically. This would result in an unsafe condition, because the thermostat, limit switch, or other condition responsive device or temperature controller would then be unable to turn off the flow of fluid, for example the flow of fuel to as gaseous fuel burner, when the temperature reaches the desired value.

One of the main objects of the present invention is to overcome these prior difficulties by providing a manual operator with electrical release with which the means for holding the valve open during the absence of power will be automatically released by the resumption of electric power whereby the valve cannot be held open by the manually actuated means but will be automatically returned to control by the electric power when it is resumed.

Another object of the invention is to provide a device in which manual opening of the valve is accomplished by simple depression or axial movement of a valve opening stem and in which there is means for holding the stem depressed and for automatically releasing the same by the resumption of electric power.

Another object of the invention is to provide a device in which there is magnetic means which is adapted to be set manually and which operates to hold the valve in open position during the absence of electric power.

Another object of the invention is to provide a device in which there is magnetic means which is adapted to be set manually and which operates to hold the valve in open position during the absence of electric power, and wherein there is means which is energized electrically by the resumption of power and which operates to release the magnetic holding means for return of the valve to control by the electric power.

Further objects and advantages, and numerous modifications and adaptations of the invention will appear from the following detailed description taken in connection with the accompanying drawings, in which:

Figure 1 is a vertical section through a combined thermoelectric safety shut-off and electroresponsive valve showing in elevation a manual operator with electrical release embodying the present invention applied thereto; and Figure 2 is a fragmentary sectional view partially in elevation of the manual operator shown in Figure 1.

The particular thermoelectric safety shut-off and solenoid valve selected for illustration is of the type disclosed and claimed in Henry F. Alfery Patent No. 2,297,854, patented October 6, 1942. This particular form of valve may, however, vary widely within the scope of the present invention.

The thermoelectric safety shut-off and solenoid valve comprises a valve body 1 having a fuel inlet 2 and a fuel outlet 3 which are tapped for connection with contiguous sections of a fuel supply pipe 4 for supplying gaseous fuel to the main burner 5. The supply of fuel to the main burner 5 may be through a mixing chamber 6 to which air is admitted as well understood in the art.

The valve body 1 has an internal wall or partition 7 which has a pair of valve openings 8 and 9 through which communication is effected between the inlet chamber 10 which is in communication with the inlet 2, and an outlet chamber 11 which is in communication with the outlet 3. The communication between the inlet chamber 10 and the outlet chamber 11 is by way of an intermediate chamber 12. The wall or partition 7 separates the chambers 10 and 11 from the chamber 12, and the chambers 10 and 11 from each other. The valve opening 8 may have a tubular valve seat member 13 presenting valve seats at its opposite ends.

Communication between the inlet chamber 10 and the intermediate chamber 12 is controlled by a valve member 14 shown of cup-shaped form and adapted to seat against the adjacent end of the valve seat member 13. The valve member 14 is carried on one end of a stem 15, the opposite end of which extends into an electromagnet hood 16 and carries an armature 17. The hood 16 is clamped to the valve body 1, for example, by a flanged union nut 18, preferably with a suitable gasket interposed therebetween.

Housed within the hood 16 is an electromagnet 20 which comprises a magnet frame 21 having a coil 22 wound thereon. The coil 22 is connected in circuit with a thermoelectric generator 23 by a lead 24. The lead 24 may, for example, comprise concentric lead conductors 25 and 26 connected in circuit at one end with concentric thermoelectric elements 27 and 28 of the thermoelectric generator 23 as more fully disclosed and claimed in Oscar J. Leins Patent No. 2,126,564, patented August 9, 1938. The thermoelectric elements 27 and 28 are joined to form a hot thermojunction 29 which, in use, is positioned to be heated by the flame of a pilot burner 30. The opposite ends of the outer tubular and inner lead conductors 25 and 26 are connected to the terminals of the coil 22, for example by a detachable terminal connector 26' such as shown in John H. Thornbery Patent No. 2,328,111, patented August 31, 1943.

While the thermoelectric generator 23 is shown in the form of a thermocouple, it is to be understood that a thermopile may be used as suitable or desired. The pilot burner 30 is positioned in lighting proximity to the main burner 5 and is supplied with fuel through a port 31 leading from the opening within the valve seat member 13 between the seats at the opposite ends thereof and a connected fuel supply tube 32 which leads to the pilot burner 30 for supplying gaseous fuel thereto.

The heat of the flame of the pilot burner 30 on the thermoelectric generator 23 is adapted to energize the electromagnet 20 sufficiently to hold the armature 17 attracted against the magnet frame 21 and thereby the valve member 14 in open position as long as the thermoelectric generator 23 is heated by the flame of the pilot burner 30. When the flame of the pilot burner 30 is extinguished, the electromagnet 20 ceases to hold the armature 17 in attracted position. A coiled spring 35 confined, for example, between the valve member 14 and a wall at the inner end of the hood 16 then moves the armature 17 to retracted position and the valve member 14 to closed position for safety shut-off of the flow of fuel to both the main burner 5 and the pilot burner 30.

The heat of the flame of the pilot burner 30 on the hot junction or hot junctions of the thermoelectric generator 23 may not be capable of moving the armature 17 to attracted position and the valve member 14 to open position. Reset means is therefore provided for resetting or cocking the armature 17 to attracted position and the valve member 14 to open position. This reset means comprises, in general, a reset stem 36 mounted for axial movement in the valve body 1. The outer end of the reset stem 36 is provided with a reset button 37. A coiled spring 38 holds the reset stem 36 in its outwardly projected position, and returns it to such position.

When the armature 17 is retracted and the valve member 14 is closed and the reset stem 36 is pressed inwardly, the inner end of the stem engages the valve and armature assembly and moves the valve member 14 to open position and the armature 17 to attracted position. They may be held in this position until the pilot burner 30 is ignited and the flame thereof has heated the hot junction of the thermoelectric generator 23 to energize the electromagnet 20 sufficiently to hold the armature 17 in attracted position and the valve member 14 in open position. The reset button 37 may then be released and will be returned to its outwardly projected position by the spring 38.

If desired, the reset stem 36 may be provided with a flow interrupter valve 40 for seating against the adjacent end of the valve seat member 13 to shut off the flow of fuel to the main burner 5 during the resetting operation and until the armature 17 is held in attracted position with the valve member 14 in open position by the energization of the electromagnet 20. The flow interrupter valve may, for example, be of the character more fully disclosed and claimed in Charles V. Hildebrecht Patent No. 2,114,446, patented April 19, 1938. Suffice it to state that when the reset stem 36 is pressed inwardly, a coiled spring 41 moves the flow interrupter valve 40 to closed position, and the coiled spring 38 in returning the reset stem 36 to its outwardly projected position moves the valve member 40 to open position against the action of the spring 41.

During the time the flow interrupter valve 40 is seated against its seat the flow of gaseous fuel to the main burner is shut off, but the valve 14 being open, fuel may flow through the pilot port 31 and tube 32 to the pilot burner 30, providing, of course, that the solenoid valve controlling the valve opening 9 is in open position as will presently appear.

Communication between the intermediate chamber 12 and the outlet chamber 11 through the valve opening 9 is controlled by a valve member 45 shown of cup-shaped form and adapted to seat upon an annular valve seat surface 46 surrounding the opening 9 and preferably on the intermediate chamber end thereof. The hub 47 of the valve 45 is attached to the stem 48 of a solenoid plunger 49, for example, by means of a pin 50 screwed into mating threaded holes in the hub 47 and pin 50.

The particular electroresponsive valve shown in the drawing is in the form of a solenoid valve of the character disclosed and claimed in Theodore A. Wetzel Patent No. 2,111,232, patented March 15, 1938. The particular form of the electroresponsive valve may, however, vary widely within the scope of the present invention.

Suffice it for purposes of the present description to state that in the particular solenoid valve selected for illustration, the stem 48, which is preferably non-magnetic, is slidable in a bore 52 extending longitudinally through the solenoid plunger or armature 49. The plunger 49 is counterbored at 53, and the stem 48 has a head 54 outwardly beyond the shoulder 55, with the parts positioned as shown in the drawing. Upon response of the armature to energization of the magnet coil 56, the shoulder 55 in the armature engages the head 54 with an impact or hammer-like blow positively to release the valve 45 from its seat and thereupon the upward movement of the armature lifts the valve 55 to open position.

The armature 49 is slidable longitudinally in a solenoid guide tube 58 of non-magnetic material, which tube is closed at its outer or upper end by a plug 60 of magnetic metal. The magnet coil 56 surrounds the upper portion of the tube 58 and, upon energization, draws the plunger 49 upwardly toward the plug 60. The upward action imposed on the plunger 49 upon energization of the coil 56 may be augmented by a magnetic or flux sleeve 62 which surrounds the upper end of the tube 58. Further details of one suitable solenoid valve structure may be obtained by reference to the previously mentioned Henry F. Alfery patent and therefore will not be repeated in the present specification.

It is desirable in the event of failure of electric power to be able to operate the valve member 45 to open position for the flow of gaseous fuel to the main burner 5 under the control of the thermoelectric safety shut-off valve member 14. For this purpose there is provided an assembly 65 which is applied to the valve body 1.

The assembly 65 comprises a cylindrical barrel 66 fitted into a bore 67 in the valve body 1. A flange 68 extends out from the barrel 66 and forms a base for the cylinder which constitutes the housing of the assembly. Between the outer part of the flange 68 and the extended boss 69 on the valve body 1 is a sealing gasket 70. Clamping ring or nut 71 is screwed onto the externally threaded portion of the boss 69, and clamps the assembly in position.

Mounted for axial reciprocatory movement in the barrel 66 with its inner end extending into the outlet chamber 11 is a manually operable shaft or stem 75. The stem 75 extends through an opening 76 in the barrel 66. The inner end of the shaft or stem 75 approaches engagement with the valve hub 47 and is enlarged to present a shoulder 77 which engages a soft sealing disc 78 which serves to limit the outward movement of the stem 75 and to provide a gas seal.

The stem 75 is held in the position shown in the drawing, and is actuated to this position, as will hereinafter appear, by a spring 79. The spring 79 bears at one end against a washer 80 which acts against suitable sealing packing 81. The other end of the spring 79 bears against a washer 82 which is held against a shoulder 83 by a pole piece 84 and nut 85 which is screwed onto the end of the stem 75.

Attached to the outer end of the stem 75 is a permanent magnet assembly comprising a pole piece 84, permanent magnet 89 and pole piece 90 which may be held together in any convenient or suitable manner, for example, by soldering or the like. Fixedly secured, for example, to the base flange 68 and positioned within the assembly housing is a magnetic cap 91. A coil 92' is wound, for example, within the channel-shaped section of the magnetic cap 91 which has its annular pole surfaces 92 and 107 presented toward the pole pieces 90 and 84.

One terminal of the solenoid coil 56 is connected by a conductor 93 to one of the line conductors 94 and 95, for example, to the conductor 95. The line conductors 94 and 95 lead from a suitable source of alternating current, such as a household current supply line of the type which averages about 115 volts. The other terminal of the coil 56 is connected by a conductor 96, for example, with a fixed contact 97 of a thermostat 98. A conductor 99 connects the other or movable terminal 100 of the thermostat to the other line conductor 94. The coil 92' may be connected, for example, by conductors 101 and 102 on the line side of the thermostat 98 as shown more or less diagrammatically in the drawing. Instead of being in the form of a thermostat, the device 98 may be any other condition responsive device, or a switch or other suitable circuit controlling device.

In the normal course of operation of the valve selected for illustration, energization or excitation of the solenoid coil 56 causes the plunger 49 to lift, thus raising the valve disc 45 from the port 9 and allowing a flow of gas through the port 9. If the pilot burner 30 is ignited and the valve disc 14 is held open by the electromagnet 20, gaseous fuel will pass to the main burner 5 where it will be ignited by the flame of the pilot burner 30.

When no electric power is available and it is desired to hold the valve disc 45 open for the passage of gas through the port 9, the cap 105 may be removed by unscrewing the same from the cylindrical housing 106 of assembly 65. The stem 75 is then pressed inwardly manually, for example, by pressing with the fingers on the outer end of the stem or the parts carried thereby. As the stem 75 moves inwardly, its inner end engages the hub 47 and moves the valve disc 45 to open position. At the same time the pole piece 90 engages surface 92 of the magnetic cap 91.

Because of the stored energy in the permanent magnet 89, magnetic flux then flows through the air gaps formed by the surface 92 and the pole piece 90 and through that formed by the surface 107 and the pole piece 84. This sets up a closed magnetic circuit which establishes a holding force sufficient to sustain the force of the spring 79 and the weight of the plunger assembly. This maintains the valve disc 45 open during the absence of electric power.

When electric power is restored, the coil 92' is energized and generates an alternating current flux which lowers the magnetic force exerted by the permanent magnet 89 and causes opening of the spring loaded air gap. Thus the valve disc 45 is no longer held magnetically in open position, but is released for control by the solenoid coil 56 as in the normal course of power operation.

The foregoing is accomplished in the following manner:

When the permanent magnet alone is causing a flow of flux, a fixed value of flux is set up determined by the ampere turns available from the magnet. When alternating current flows through the coil 92', a variable source of ampere turns is superimposed on the fixed value of ampere turns. As the magnetizing force varies, the flux varies above and below the fixed value. When the alternating current magnetic force is strong enough, the instantaneous flux will be depressed below the value required for supporting the action of the spring 79. When this point is reached, the stem 75 and the magnet assembly are forced away from the cap 91 and the stem 75 is brought to its retracted position. This allows the solenoid plunger assembly to open and close the valve disc 45 in response to the automatic cycling normally used.

The foregoing arrangement of permanent magnet and electromagnet disengages the manual resetting device immediately upon the return of line voltage, which then places the control of the valve 45 under the command of the controlling thermostat 98.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. In an electrically operated control device, in combination, a controlling member operable from a first position to a second position, an electrically energizable operator for said control member connectable to a source of electrical energy to operate said controlling member from its first position to its second position, means manually operable to move said controlling member from its first position in the event of failure of the source, holding means independent of electrical current flow including a magnetic member movable with said manual means and a stationary magnetic member, said magnetic members when in attracted relation when moved thereto by operation of said manual means retaining said controlling member from movement to its first position, and electromagnetic disabling means supplied from the same source as said operator and operative whenever energized to render said magnetic members incapable of retaining said controlling member from movement to its first position, whereby whenever said source is effective to energize said operator said holding means is disabled and operation of said controlling member is returned to control of said operator.

2. In an electrically operated control device, in combination, a valve member operable from flow-preventing to flow-permitting positions, a source of electrical energy, an electromagnetic operator for said valve member connectable to said source to operate said valve member from its flow-preventing to its flow-permitting position, a circuit for said electromagnetic operator including said source and a condition responsive means to render movement of said valve member from flow-preventing to flow-permitting position dependent upon a given condition, means manually operable to move said valve member to flow-permitting position in the event of failure of said source, holding means independent of electrical current flow including a magnetic member movable with said manual means and a stationary magnetic member, said magnetic members when in attracted relation when moved thereto by operation of said manual means retaining said valve member in flow-permitting position, and electromagnetic disabling means supplied from said source and operative when energized to render said magnetic members incapable of retaining said valve member in flow-permitting position, whereby whenever said source is effective to energize said operator and said given condition exists said holding means is disabled and operation of said valve member is returned to control of said operator.

3. In an electrically operated control device, in combination, a controlling member operable from a first position to a second position, an electrically energizable operator for said control member connectable to a source of electrical energy to operate said controlling member from its first position to its second position, means manually operable from a first position to a second position to thereby move said controlling member from its first position to its second position in the event of failure of the source, holding means independent of electrical current flow including a magnetic member having connection with said manual means and being operable therewith from a first position to a second position, said holding means including a stationary member for coaction with said magnetic member while the latter is in its second position to retain said manual means and controlling member in their second positions, and electromagnetic disabling means supplied from the same source as said operator and operative whenever energized to render said stationary members incapable of coacting with said magnetic member to retain said manual means and controlling member in their second positions, whereby whenever this source is effective to energize said operator said holding means is disabled and operation of said controlling member is returned to control of said operator.

4. In an electrically operated control device, in combination, a controlling member operable from a first position to a second position, an electrically energizable operator for said control member connectable to a source of electrical energy to operate said controlling member from its first position to its second position, means including a stem manually movable from a first position to a second position to thereby move said controlling member from its first position to its second position in the event of failure of the source, holding means independent of electrical current flow including a magnetic member attached to said stem and being movable therewith from a first position to a second position, said holding means including a stationary member for coaction with said magnetic member while the latter is in its second position to retain said manual means and controlling member in their second positions, and electromagnetic disabling means comprising a winding juxtaposed with respect to said stationary member and supplied from the same source as said operator and operative whenever energized to render said stationary member incapable of coacting with said magnetic member to retain said stem and controlling member in their second positions, whereby whenever the source is effective to energize said operator said holding means is disabled and operation of said controlling member is returned to control of said operator.

5. In an electrically operated control device, in combination, a valve member operable from flow-preventing to flow-permitting positions, a source of electrical energy, an electromagnetic operator for said valve member connectable to said source to operate said valve member from its flow-preventing to flow-permitting position, a circuit for said electromagnetic operator including said source and a condition responsive means to render movement of said valve member from flow-preventing to flow-permitting position dependent upon a given condition, means including a manually reciprocatable stem to effect movement of said valve member from its flow-preventing to flow-permitting position, holding means including a permanent magnet attached to said stem and being movable therewith from a first position to a second position while said valve member is moved from flow-preventing to flow-permitting position, said holding means also including a stationary magnetic member for magnetic cooperation with said permanent magnet while the latter is in its second position to thereby retain said valve member in its flow-permitting position, and electromagnetic means comprising a winding wound on said stationary magnetic member and connected to said source of electrical energy and operative when energized to render said stationary member incapable of magnetic cooperation with said permanent magnet to thereby render said holding means incapable of retaining said stem in its second position and said valve member in its flow-permitting position, said manual means further including biasing means urging said stem and permanent magnet to their first positions.

6. The combination with an electrically operated control device comprising, a controlling member operable from a first position to a second position, and an electrically energizable operator for said controlling member connectable to a source of electrical energy to operate said controlling member from its first to its second position, of means including a stem manually reciprocatable from a first position to a second position to thereby move said controlling member from its first position to its second position in the event of failure of the source, holding means comprising a permanent magnet and pole pieces carried by said stem for reciprocatory movement therewith from a first position to a second position, said holding means including a magnetic cap supported in fixed position and having pole surfaces presented toward said pole pieces for cooperation therewith when said holding means is in its second position to retain said controlling member in its second position, said magnetic cap being of annular form and channel-shaped section, and electromagnetic disabling means comprising a winding wound within the channel-shaped section of said magnetic cap and adapted whenever energized to render said magnetic cap incapable of cooperating with said pole pieces to retain said controlling member in its second position, whereby whenever the source is effective to energize said operator said holding means is disabled and operation of said controlling member is returned to control of said operator.

7. The combination with an electrically operated control device comprising, a controlling member operable from a first position to a second position, an electrically energizable operator for said control member connectable to a source of electrical energy to operate said controlling member from its first position to its second position, and an energizing circuit for said operator including a source of electrical energy and condition responsive means controlling energization of said operator to position said controlling member in accordance with said condition, of means including a stem manually movable from a first position to a second position to thereby move said controlling member from its first position to its second position, holding means including a permanent magnet attached to said stem and being movable therewith from a first position to a second position, said holding means including a stationary member for coaction with said permanent magnet while the latter is in its second position to retain said manual means and controlling member in their second positions, and electromagnetic disabling means comprising a winding on said stationary member supplied from said source and operative when energized to render said stationary member incapable of coacting with said permanent magnet to retain said stem and controlling member in their second positions, disestablishment of energy from said source thereby enabling said holding means to maintain said controlling member in its second position and reestablishment of said energy rendering said holding means ineffective to maintain said controlling member in its second position, operation of said controlling member thereby being returned to control of said operator.

8. The combination with an electrically operated control device comprising, a valve member operable from flow-preventing to flow-permitting position, a source of electrical energy, an electromagnetic operator for said valve member connectable to said source to operate said valve member from its flow-preventing to flow-permitting position, and a circuit for said electromagnetic operator including said source and a condition responsive means to render movement of said valve member from flow-preventing to flow-permitting position dependent upon a given condition, of means including a manually reciprocatable stem to effect movement of said valve member from its flow-preventing to flow-permitting position, holding means including a permanent magnet attached to said stem and being movable therewith from a first position to a second position while said valve member is moved from flow-preventing to flow-permitting position, said holding means also including a stationary magnetic member for magnetic cooperation with said permanent magnet while the latter is in its second position to thereby retain said valve member in its flow-permitting position, and electromagnetic means comprising a winding wound on said stationary magnetic member and connected to said source of electrical energy and operative when energized to render said stationary member incapable of magnetic cooperation with said permanent magnet to thereby render said holding means incapable of retaining said stem in its second position and said valve member in its flow-permitting position, said manual means further including biasing means urging said stem and permanent magnet to their first positions.

9. The combination with a combined temperature and automatic pilot control comprising, a valve body having a passage therethrough for the flow of fluid, a first flow-controlling member in said passage having flow-permitting and flow-preventing positions, reset means operable to effect movement of said first flow-controlling member from its flow-preventing to flow-permitting position, thermoelectrically energizable means for holding said first controlling member in its flow-permitting position, means including a second flow-controlling member and thermostatically controlled operating means connectable to a source of electrical energy for movement of said second flow-controlling member between flow-preventing and flow-permitting positions to control the flow of fluid through said passage but only when said first flow-controlling member is in its flow-permitting position, of means including a stem manually reciprocatable from a first position to a second position to thereby move said second controlling member from its flow-preventing position to its flow-permitting position in the event of failure of the source for flow of fluid through said body while said first flow-controlling member is in its flow-permitting position, holding means comprising a permanent magnet and pole pieces carried by said stem for reciprocatory movement therewith from a first position to a second position, said holding means including a magnetic cap supported in fixed position and having pole surfaces presented toward said pole pieces for cooperation therewith when said holding means is in its second position to retain said second controlling member in its flow-permitting position, and electromagnetic disabling means comprising a winding wound within said magnetic cap energized from said source and adapted whenever energized to render said magnetic cap incapable of cooperating with said pole pieces to retain said second controlling member in its flow-permitting position, thereby returning control thereof to said operating means.

10. The combination with a fluid flow-controlling member, of means including a stem manually reciprocatable from a first position to a second position to thereby move said controlling member from its flow-preventing to flow-permitting position, holding means comprising a permanent magnet and pole pieces carried by said stem for reciprocatory movement therewith from a first position to a second position, said holding means including a magnetic cap supported in fixed position and having pole surfaces presented toward said pole pieces for cooperation therewith when said holding means is in its second position to retain said controlling member in its flow-permitting position, said magnetic cap being of annular form and channel-shaped section, and electromagnetic disabling means comprising a winding wound within the channel-shaped section of said magnetic cap and adapted whenever energized to render said magnetic cap incapable of cooperating with said pole pieces to retain said controlling member in its flow-permitting position.

References Cited in the file of this patent

UNITED STATES PATENTS

| | | |
|---|---|---|
| 2,126,587 | Thornberry | Aug. 9, 1938 |
| 2,188,803 | Boehne | Jan. 30, 1940 |
| 2,275,839 | Boehne | Mar. 10, 1942 |
| 2,290,047 | Hildebrecht | July 14, 1942 |
| 2,358,999 | Ray | Sept. 26, 1944 |
| 2,435,425 | Cunningham | Feb. 3, 1948 |
| 2,469,609 | Ray | May 10, 1949 |
| 2,608,353 | Cobb | Aug. 26, 1952 |
| 2,649,767 | Matthews | Aug. 25, 1953 |